United States Patent
Chari et al.

(10) Patent No.: US 10,277,590 B2
(45) Date of Patent: Apr. 30, 2019

(54) COGNITIVE INTELLIGENCE BASED VOICE AUTHENTICATION

(71) Applicant: International Business Machines Corporation, Armonk, NY (US)

(72) Inventors: Suresh N. Chari, Tarrytown, NY (US); Kapil K. Singh, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 15/407,294

(22) Filed: Jan. 17, 2017

(65) Prior Publication Data

US 2018/0205726 A1    Jul. 19, 2018

(51) Int. Cl.
| | |
|---|---|
| *H04L 29/06* | (2006.01) |
| *G10L 15/26* | (2006.01) |
| *G10L 17/02* | (2013.01) |
| *G10L 17/06* | (2013.01) |
| *G10L 17/22* | (2013.01) |
| *G10L 17/26* | (2013.01) |
| *G10L 17/04* | (2013.01) |

(52) U.S. Cl.
CPC .......... *H04L 63/0861* (2013.01); *G10L 17/02* (2013.01); *G10L 17/04* (2013.01); *G10L 17/06* (2013.01); *H04L 63/123* (2013.01); *G10L 15/26* (2013.01)

(58) Field of Classification Search
CPC ... H04L 63/0861; H04L 63/123; G10L 17/26; G10L 17/06; G10L 17/02; G10L 15/26; G10L 17/22
See application file for complete search history.

(56) References Cited

U.S. PATENT DOCUMENTS

| | | |
|---|---|---|
| 7,237,717 B1 | 7/2007 | Rao et al. |
| 7,657,431 B2 | 2/2010 | Hayakawa |
| 8,694,315 B1 * | 4/2014 | Sheets .............. G06Q 20/40145 704/246 |

(Continued)

OTHER PUBLICATIONS

"Voice Biometrics: Balancing Security, Usability and Privacy for User Authentication in Banking Applications and Mobile Payments", Agnitio, Agnitio-corp.com, 2015, 4 pages.

(Continued)

*Primary Examiner* — Jahangir Kabir
(74) *Attorney, Agent, or Firm* — Francis Lammes; Stephen J. Walder, Jr.; Jeffrey S. LaBaw

(57) ABSTRACT

Mechanisms are provided to detect a potentially fraudulent voice conversation. The mechanisms process a corpus of electronic information to extract a fraud feature representative of at least one fraudulent activity, receive a first voice input from a user, and convert the first voice input into a textual representation of the first voice input and a set of behavioral speech characteristics associated with the user. The mechanisms generate a speech model for the user based on the textual representation and the behavioral speech characteristics, receive a second voice input from an entity requesting access to resources associated with the user, and evaluate the second voice input based on the speech model for the user and the fraud feature. The mechanisms generate an output indicating whether or not the entity is the user based on results of the evaluation.

20 Claims, 4 Drawing Sheets

(56) References Cited

U.S. PATENT DOCUMENTS

| | | | |
|---|---|---|---|
| 8,831,941 B2 * | 9/2014 | Gilbert | G06Q 40/00 |
| | | | 379/189 |
| 9,113,001 B2 * | 8/2015 | Rajakumar | G10L 17/00 |
| 9,117,212 B2 * | 8/2015 | Sheets | G06Q 20/40145 |
| 2005/0075985 A1 | 4/2005 | Cartmell | |
| 2008/0172230 A1 | 7/2008 | Hayakawa | |
| 2008/0195387 A1 * | 8/2008 | Zigel | G10L 17/06 |
| | | | 704/236 |
| 2012/0254243 A1 * | 10/2012 | Zeppenfeld | H04M 15/47 |
| | | | 707/778 |
| 2015/0142446 A1 | 5/2015 | Gopinathan et al. | |
| 2015/0199502 A1 | 7/2015 | Chen et al. | |
| 2015/0350438 A1 * | 12/2015 | Arslan | G10L 25/63 |
| | | | 379/88.01 |
| 2016/0148012 A1 * | 5/2016 | Khitrov | G06F 21/32 |
| | | | 726/19 |

OTHER PUBLICATIONS

Kajarekar, Sachin et al., "TalkPrinting": Improving Speaker Recognition by Modeling Stylistic Features, Speech Technology and Research Laboratory, SRI International, Menlo Park, CA, Jan. 2003, 6 pages.

* cited by examiner

COGNITIVE INTELLIGENCE BASED VOICE AUTHENTICATION

BACKGROUND

The present application relates generally to an improved data processing apparatus and method and more specifically to mechanisms for voice authentication based on cognitive intelligence.

Voice as a communication channel is extensively used for providing a variety of services that require confidence in the caller's identity. Such systems often require the user to provide a voice response to a query, such as providing a password, in order to verify the caller's identity and then provide access to information that is associated with the verified caller. For example, such services include telephone banking, healthcare systems, call centers and many others. Identity theft with such systems is a growing concern since individuals committing fraud (referred to as "fraudsters") may be able to access sensitive information, take over access to accounts, and perform other malicious activities. Such fraudsters often use some related information, e.g., a friend's identity, or recent event, e.g., password leaks at a bank, to be more effective.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory. The at least one memory comprises instructions which are executed by the at least one processor to specifically configure the at least one processor to detect a potentially fraudulent voice conversation. The method comprises processing, by the data processing system, a corpus of electronic information to extract a fraud feature representative of at least one fraudulent activity, receiving, by the data processing system, a first voice input from a user, and converting, by the data processing system, the first voice input into a textual representation of the first voice input and a set of one or more behavioral speech characteristics associated with the user. The method further comprises generating, by the data processing system, a speech model for the user based on the textual representation and the one or more behavioral speech characteristics. Moreover, the method comprises receiving, by the data processing system, a second voice input from an entity requesting access to resources associated with the user, and evaluating, by the data processing system, the second voice input based on the speech model for the user and the fraud feature. In addition, the method comprises generating, by the data processing system, an output indicating whether or not the entity is the user based on results of the evaluation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
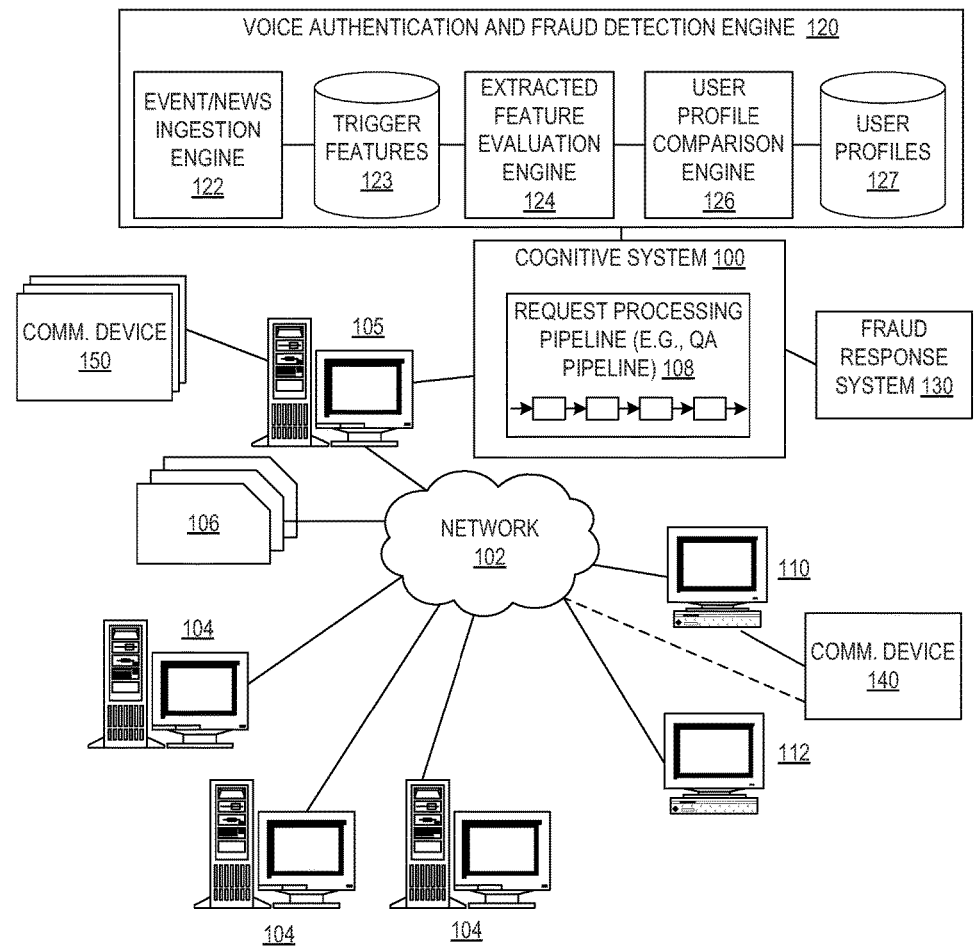
FIG. 1 depicts a schematic diagram of one illustrative embodiment of a cognitive system having an associated voice authentication and fraud detection system in accordance with one illustrative embodiment.

The illustrative embodiments provide mechanisms for implementing cognitive intelligence to detect voice fraud and authenticate a caller. As noted above, in known voice authentication systems, the caller is typically authenticated by the callee, whether it be a human being or automated system, by requesting that the caller provide the particular security information for the account or information that the caller is attempting to access. For example, the callee may request that the caller provide the caller's home address, social security number (SSN), personal identifier number (PIN), password, etc. which may then be verified with stored information associated with the account or information attempting to be accessed. Thus, if the caller provides the correct security information, it is assumed that the caller's identity is the identity of the person whose account or information is being accessed.

While this is one option for providing authentication of callers attempting to access information stored or otherwise controlled by the callee, unfortunately end users often rely on reverse communication channel security, which is relatively weak. That is, end users rely on weak credentials, such as the calling number and/or the user's familiarity with the voice of the callee, to authenticate the calling entity. With the increased proliferation of phone fraud, weaknesses in this approach have surfaced and users are often tricked by fraudsters to disclose their personal information, including social security number and PIN, that could be further used to masquerade as the user when accessing accounts or other sensitive information about the user. This is often a problem with elderly individuals, young individuals, foreign individuals (or individuals whose native language is not that of the country in which they live), or other individuals that tend to be more trusting of callers or who may be susceptible to aggressive callers that coerce users into providing security information by threatening dire or undesirable consequences should the security information not be disclosed. For example, a fraudster may indicate that they are from the user's credit card company and that there was a breach of their account and that they need to change the user's PIN but they need to know the old PIN first.

The illustrative embodiments provide mechanisms to address such situations by providing cognitive intelligence to detect voice fraud and authenticate callers. In particular, the illustrative embodiments provide mechanisms to convert a voice conversation to text while preserving certain voice behavioral pattern information, such as the intervals between spoken words and the like. The illustrative embodiments further provide mechanisms for using the unstructured text generated from the conversion of the voice communication to build behavioral and cognitive intelligence around the user, such as the words or phrases used by the user, initial salutations used by the user, and the like. The illustrative embodiments also provide mechanisms for leveraging the cognitive intelligence from external sources, such as related new articles, bank advisories, or any other source of information of potential fraudulent activity, to identify anomalous behavior. Instead of relying on weak challenge-response or audio analysis, the mechanisms of the illustrative embodiments utilize rich cognitive intelligence from several data sources and correlates this intelligence with context and behavior of the user conversation to identify anomalies and/or authenticate the user.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
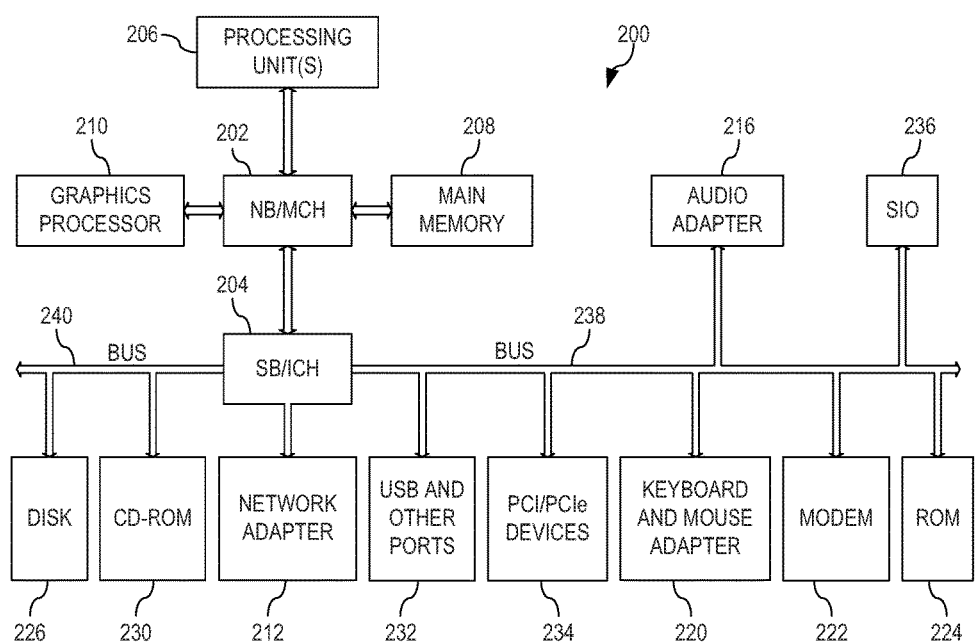
FIG. 2 is a block diagram of an example data processing system in which aspects of the illustrative embodiments are implemented.
Figure 3:
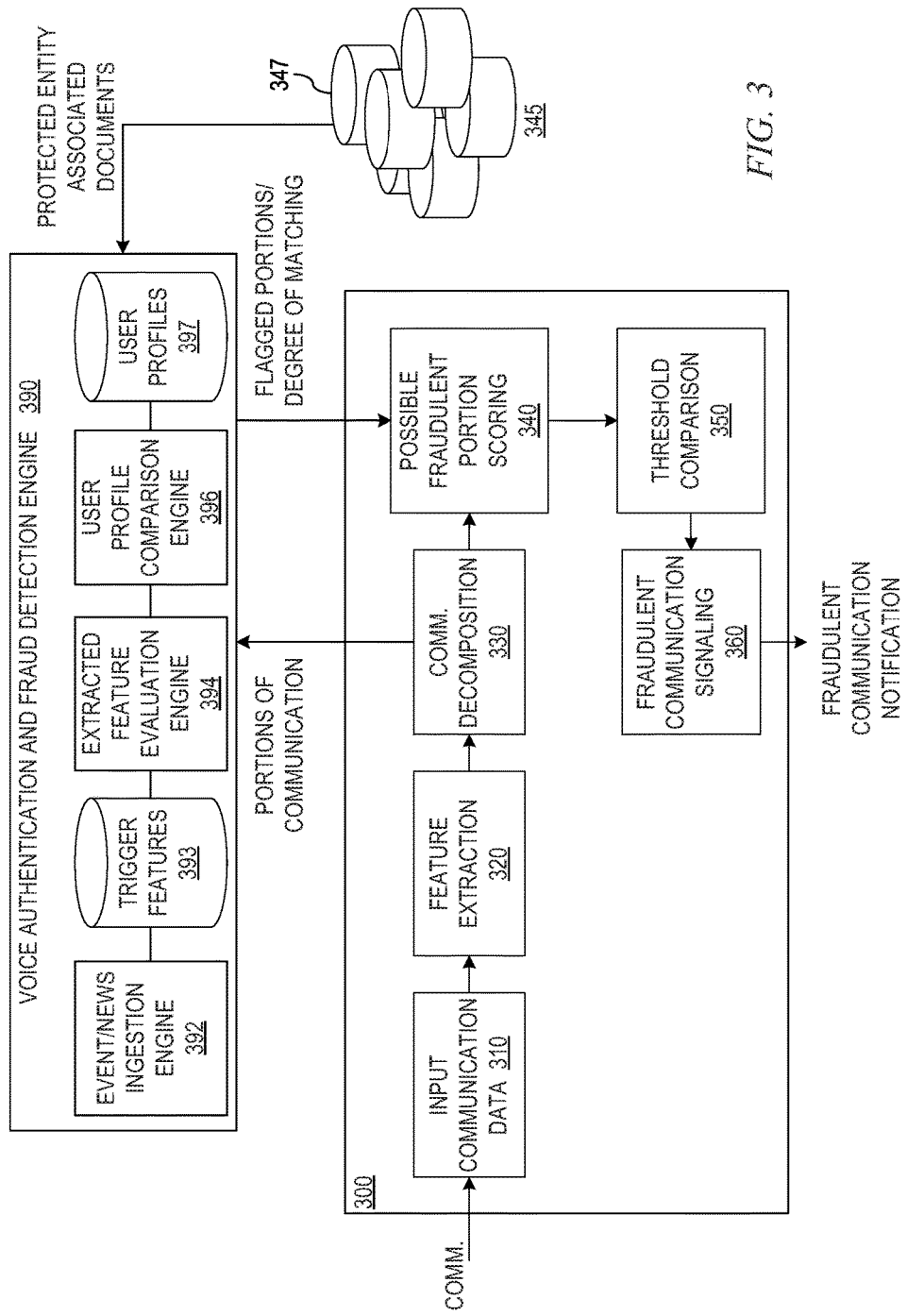
FIG. 3 illustrates a request processing pipeline for processing an input portion of a communication in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a cognitive processing pipeline, methodology, and computer program product with which the mechanisms of the illustrative embodiments are implemented. The cognitive processing pipeline is part of a cognitive system which, while shown as having a single cognitive processing pipeline, may in fact have multiple cognitive processing pipelines. For example, the separate cognitive processing pipelines may be separately trained to identify and process different aspects of voice conversation based features, e.g., behavioral features and/or context based features, may be separately trained for analyzing different domains of information present in voice conversations and/or specific sources of information about different domains, e.g., financial domain, healthcare based domain, security domains, etc. In some cases, each cognitive processing pipeline may be associated with a different protected or protective entity, e.g., there may be a separate cognitive processing pipeline for each of a plurality of different banks or other financial institutions, different healthcare service providers, or any other protected or protective entity that has sensitive information or protects sensitive information from fraudulent access.

As will be discussed in greater detail hereafter, the illustrative embodiments are integrated in, augment, and extend the functionality of the cognitive system, and cognitive processing pipeline mechanisms of the cognitive system, with regard to identifying potentially fraudulent voice conversations or authenticating a user via cognitive analysis of a voice conversation between the user and a protective entity. As such, the cognitive system actively builds cognitive intelligence based on sources of information indicating, such as via structure or unstructured (e.g., natural language) content, events and news related to the protected or protective entity (referred to herein also as the callee). For example, if the callee is a bank, then reports of individuals having obtained fraudulent access to bank customer social security numbers provides information of events and news that would be related to calls being received by the callee in which social security numbers are a basis of authentication of the caller. The cognitive system further builds behavior and context based profiles for callers (herein referred to as users), that indicate the speaking behavior (e.g., intervals between words, inflections, or any other audio characteristics of the users speaking patterns) and context information (e.g., word or terminology usage) for the user.

This information is used by the cognitive system to target portions of a conversation corresponding to the cognitive intelligence gathered for events related to a protected or protective entity (callee) and identifying features in those targeted portions that may be indicative of a fraudulent exchange between the caller and the callee. These identified features may be scored in accordance with the training of the cognitive system to generate a confidence score indicative of how confident the cognitive system is that the call is fraudulent. This score may be compared to a threshold score which, if met or exceeded, indicates the call to be most likely fraudulent and initiates an operation, such as sending an alert message to an authorized individual, such as a human operator of the callee engaged in the communication, logging call and caller information, rejecting an access attempt by the caller, initiating a secondary authentication operation, such as requiring the user/caller to perform an operation via another device or communication system on a registered device, or the like. In this way, cognitive intelligence based targeted identification of potentially fraudulent communications with a callee may be performed.

One of the major aspects of the illustrative embodiments is the implementation of logic within a cognitive system to perform operations for generating cognitive intelligence and user/caller profiles for use in detecting fraudulent communications. As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, automated attendant services for communicating with users, various types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system). The illustrative embodiments may operate using a QA pipeline based cognitive system whose functionality is configured to operate on a portion of text corresponding to a captured communication between a caller and a callee, for example. In such a case, the QA pipeline operates as a request processing pipeline in which many of the functions of the QA pipeline are utilized to provide cognitive analysis of the input, scoring and evaluation of the potential results of the processing, and selection of a final result. Thus, a brief description of a QA pipeline is provided herein to provide a context for understanding the functionality as it is applied to processing textual conversions of captured communications as described hereafter.

A QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

The QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

It should be noted that, in accordance with the illustrative embodiments, the input question referred to above may be formatted or formulated as a stated or implied request rather than in the form of a natural language question. For example, with the illustrative embodiments set forth herein, such a QA pipeline may be configured to process natural language text, or unstructured text, of a conversation being conducted between a user (caller) and a protected or protective entity (callee—either human or automated), as the "input question" with the implied request or question being to identify whether the text indicates a fraudulent intent or the identity of the caller is fraudulent, a request to authenticate the user, or the like. In such a case, the QA pipeline may be specifically trained and configured to operate on ingested information from a corpus indicating events, news, or other reported information regarding the callee which may be used to authenticate users or identify potentially fraudulent communications. This information may be used to identify key terms, phrases, portions of communications, or the like, that may be indicative of areas where fraudulent content is likely to be presented in view of reported information, events, and news.

The QA pipeline may further be configured to apply patterns specified in a user profile to targeted portions of such communications to determine if there is a likelihood that the targeted portions contain fraudulently supplied information, e.g., the person providing the portion of the communication is doing so with fraudulent intent or is not the person they claim to be, i.e. identity theft is involved. If the patterns of features extracted from the portion of the communication that is input to the QA pipeline do not match the patterns specified in the user profile of the user that is indicated to allegedly be the source of the communication, then the portion of communication may be marked as potentially fraudulent. The marked portion of the communication may be further analyzed to generate a confidence score for indicating a confidence that the portion of the communication is in fact fraudulent.

Thus, as a conversation is being conducted between the caller and the callee, the textual or audio (converted to text) input may be input to the QA pipeline for processing by extracting features of the input and identifying features in the input that correspond to trigger features identified via ingesting event, news, or other information of a corpus. If a trigger feature is identified in the input, the portion of content of the input is considered a hypothesis or "candidate answer" indicating a potentially fraudulent portion of content. This hypothesis or "candidate answer" may then be further analyzed by comparison of extracted features from the portion of content to user profile information to generate a score indicative of mismatches of the extracted features with that of the information in the user profile, and thus a score indicative of a confidence that the portion of content is fraudulent in nature or source, e.g., the person providing the information is not who they say that they are. This confidence score can be used to return a result indicative of whether or not the communication is fraudulent which can then be used to trigger an operation.

FIG. 1 depicts a schematic diagram of one illustrative embodiment of a cognitive system having an associated voice authentication and fraud detection system in accordance with one illustrative embodiment. The cognitive system 100 is implemented on one or more computing devices 105 (comprising one or more processors and one or more memories, and potentially any other computing device elements generally known in the art including buses, storage devices, communication interfaces, and the like) connected to the computer network 102. The network 102 includes multiple computing devices 104, 105, 110, and 112 in communication with each other and with other devices or components via one or more wired and/or wireless data communication links, where each communication link comprises one or more of wires, routers, switches, transmitters, receivers, or the like. The cognitive system 100 and network 102 enables cognitive processing of communication content between the protected or protective party system 105, and one or more cognitive system users via their respective computing devices 110-112. Other embodiments of the cognitive system 100 may be used with components, systems, sub-systems, and/or devices other than those that are depicted herein.

The cognitive system 100 is configured to implement a request pipeline 108, such as a QA pipeline or the like, that receives inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and cognitive system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input communications with a human being or automated system at the protected or protective entity computing system 105 where they are analyzed by the cognitive system 100 based on the content in the corpus of data 106. In one embodiment, the communications are formed using natural language in either a textual format, audio format, a combination of textual or audio format, or other multimedia format, e.g., streaming video data comprising visual and audio data. The cognitive system 100 parses and interprets the communications via a request pipeline 108, and provides an indication of whether the source of the communication is authenticated or the source of the communication is likely involved in fraudulent activity. In some embodiments, the cognitive system 100, in response to detecting a fraudulent source or activity, invokes operations of a fraud response system 130 to perform operations to alert individuals to the fraudulent activity, store information about the fraudulent activity, and/or protect a background system of the protected or protective entity computing system 105 from fraudulent access to protected data.

In some illustrative embodiments, the cognitive system 100 may be the IBM Watson™ cognitive system available from International Business Machines Corporation of Armonk, N.Y., which is augmented with the mechanisms of the illustrative embodiments described hereafter. The cognitive system 100 may be augmented to include logic implemented in specialized hardware, software executed on hardware, or any combination of specialized hardware and software executed on hardware, for implementing a voice authentication and fraud detection engine 120. The logic of the voice authentication and fraud detection engine 120 is shown as a separate entity in FIG. 1 for purposes of illustration, however the implementations of the voice authentication and fraud detection engine 120 are not limited to such. Rather, the logic of the voice authentication and fraud detection engine 120, or portions thereof, may be separate from, or integrated in, the logic of the cognitive system 100 and/or request processing pipeline 108.

The voice authentication and fraud detection engine 120 operates on input received from a user, such as a user of a computing device 110, which is directed to an entity associated with the protected or protective entity computing system 105. In particular, this input is a communication from the user of the communication device 140 to a human user using a communication device 150, or an automated response system, associated with the computing device 105. The user may make use of a communication device 140 which may be separate or integrated with the computing device 110, e.g., a smart phone having both communication and computing capabilities. The communication device 140, in some implementations, may communicate directly with the network 102 without having to work in conjunction with a computing device 110, such as in the case of a conventional analog telephone or the like.

Similarly, the protected or protective entity computing system 105 may have one or more associated communication devices 150 with which human operators may conduct communications with the user of communication device 140. For example, the computing system 105 may host hardware and software for supporting a call center in which multiple human operators respond to calls from users via a plurality of communication devices 150. Alternatively, or in addition, the communication device 150 may provide an automated response system, automated attendant, or any other automated voice system that is able to communicate with the user and respond to inputs from the user of communication device 140.

It should be noted that while the example embodiment shown in FIG. 1 assumes a voice over data network communication between the communication devices 140 and 150, the illustrative embodiments are not limited to such. Rather the network 102 may comprise telephone or other analog based communication networks with subsequent conversion of analog signals to digital representation at the protected or protective computing device 105. Any suitable voice communication technology may be used including analog and/or digital data based communication technologies. For purposes of the following description, it will be assumed that a voice over data network, e.g., a Voice Over IP (VOIP) network, is utilized in which voice communication is converted to data packets which are transported using TCP/IP between computing devices.

The computing device 105 is referred to as a protected or protective computing device 105 because it may be a computing device that is protected by the voice authentication and fraud detection engine 120 such that data stored in the computing device 105 or associated storage devices may be protected by the operation of the voice authentication and fraud detection engine 120. Alternatively, the computing device 105 may provide the protective functionality and services to other computing devices 104 such that the computing device 105 is a protective computing device even though it may not itself store the data that is attempting to be accessed by a user of the communication device 140.

The cognitive system 100 and the associated or integrated voice authentication and fraud detection engine 120 may operate as a background process for processing voice communication flowing between the communication device 140 and the communication device 150 via computing device 105. That is, as voice communication is received in the computing device 105, the audio of the voice communication is converted to an unstructured, e.g., natural language, textual version of the voice communication through known or later developed voice (audio) to text conversion technologies.

The voice to text conversion preferably retains voice characteristic information about the original voice input as metadata. For example, the voice metadata may include information including length of pauses between spoken words, inflections, accents, or any other characteristics indicative of the speech patterns or manner by which the user speaks. In general, mechanisms are known that extract such features from voice input, for example there are a number of voice biometric authentication systems and speech analysis tools that are able to extract such features, and any current or later developed mechanisms for extracting such features may be used without departing from the spirit and scope of the illustrative embodiments.

The textual data and speech pattern metadata generated from the conversion is provided as input to the cognitive system 100 and associated request processing pipeline 108 for processing. It should be noted that when the user of communication device 140 initiates the communication with communication device 150 via computing device 105, the user submits an identifier of who the user purports to be, e.g., a name, user identifier, phone number, or other identifier. This information may be passed to the cognitive system 100 as part of the information associated with the communication session between the communication device 140 and communication device 150. The cognitive system 100 may use this user identifier information to retrieve a corresponding user profile for the user, or generate a new user profile for the user based on analysis of the current voice communications.

The request processing pipeline 108 of the cognitive system 100 performs initial processing of the unstructured text data to extract natural language features indicative of content of the communication, e.g., the terms and phrases used, and the like. Thus, through analysis of the text itself, the terms and phrases used by the user are identifiable, where each term may be associated with a count of the usage of each term indicating the terms that are most used by the user. The speech pattern metadata generated from the conversion of voice to text provides speech pattern features which, along with the term/phrase usage information, represents the user profile data for characterizing the way in which the user speaks. This information may be compiled and associated with the user identifier of the user to generate a user profile which is stored in a user profile database 127 in response to a user profile not already being present in the user profiles database 127.

When a user communicates via communication device 140 with communication device 150 via computing device 105. The user identifier of the user is used by the cognitive system 100, and in particular the voice authentication and fraud detection engine 120 associated with the cognitive system 100, to perform a lookup operation in the user profiles database 127 to find a corresponding user profile having term/phrase usage information and speech pattern metadata. In addition, the natural language features extracted from the text data input of the communication may be evaluated to identify whether the content of the communication has any key words or phrases that are triggers for identifying potential portions of communications where fraudulent intent may be identified.

That is, the voice authentication and fraud detection engine 120 may ingest documents of the corpus 106 that correspond to the protected entity or topics associated with the protected entity. For example, if the voice authentication and fraud detection engine 120 is associated with a particular banking entity, then documents in the corpus 106 that reference that banking entity, or banking/financial topics, and further reference security issues may be indicative of information that is important to ingest to identify triggers for potential fraudulent communications. For example, if a document in the corpus 106 describes a recent leak of customer accounts at a banking entity, then terms/phrases associated with such a leak may be stored as keywords and phrases that are triggers for identifying portions of communications that may be directed to similar security issues. For example, if the document mentions social security numbers, then this is indicative of a topic associated with a security issue that may be a trigger for identifying portions of other communications that mention social security numbers. Thus, for example, if Bank A has an article published into the corpus 106 describing a leak of customer social security numbers, and a later communication from a user 140 involves a portion that references the user's social security number, the voice authentication and fraud detection engine 120 identifies that portion of the communication as matching a trigger key word or phrase associated with a potential security issue.

The key words and phrases determined to be triggers associated with security issues through ingestion, by the event/news ingestion engine 122, of documentation from the corpus 106 corresponding to events, news, or other information associated with the protected entity or referencing topics associated with the protected entity, are stored in the trigger features database 123. The extracted feature evaluation engine 124 compares extracted features of the converted text data of a communication between the user of communication device 140 and an operator of communication device 150 or automated response system with the trigger features stored in the trigger features database 123. If there is a matching key word or phrase present in the extracted features, then the corresponding portion of the communication is marked as a potential portion where a fraudulent exchange between the user of communication device 140 and communication device 150 is present.

Marked portions of the text data, and its corresponding speech pattern metadata, are provided to the user profile comparison engine 126 which compares the terms/phrases used in the marked portion of text, as well as the speech pattern features of the marked portion of text, to term/phrase usage information and speech pattern features associated with the user profile of the user of the communication device 140, as retrieved from the user profiles database 127. A degree of matching between the user profile's term/phrase usage information and speech pattern features and those extracted from the marked portions of the communication is calculated to generate a confidence score indicative of how confident the engine 120 is that the marked portion is fraudulent, or not fraudulent based on the particular implementation. In other words, a confidence score is generated that indicates the likelihood that the marked portion which is associated with a security issue as indicated by the trigger features, is provided by the user that the is purported to be the source of the marked portion, or is instead from someone fraudulently claiming to be that user.

The confidence score for a portion of the communication is compared to a threshold confidence score to determine if the portion of communication is determined to be fraudulent, e.g., confidence is equal to or greater than a particular threshold, or equal to or lower than another threshold depending on the particular implementation. In response to the confidence score meeting a particular relationship with a threshold, the voice authentication and fraud detection engine 120 flags the portion of the communication as fraudulent. This flagging of fraudulent portions of communications may result in the flagged portions being reported to the fraud response system 130. The fraud response system 130 may then perform an operation based on the identification of the fraudulent portion of the communication. This operation may take many different forms depending on the particular implementation. In some cases, the operation may be to report the fraudulent communication to an authorized individual, such as by sending an alert message to a computing device corresponding to the authorized individual to warn of the fraudulent activity. In other cases, the operation may be to log the communications for future action. In still further cases, the operation may be to disable access to an account or data attempting to be accessed as part of the communication. Of course any combination of operations for responding to fraudulent communications may be used without departing from the spirit and scope of the illustrative embodiments.

It should be appreciated that while the depicted example shows the cognitive system 100 and voice authentication and fraud detection engine 120 being associated with or deployed in the protected or protective computing system 104, the illustrative embodiments are not limited to such. Rather, in other illustrative embodiments, the computing device 104 may operate as a centralized processing system which receives inputs from agent software modules executing on one or more other computing systems 104 that handle communications from users. In such embodiments, the agents deployed at these other computing systems 104 may convert communications to unstructured textual content and provide that content to the cognitive system 100 and voice authentication and fraud detection engine 120 for processing, with corresponding results being returned to the agents indicating whether or not the communications are likely to be fraudulent. Based on the results of such processing, each individual computing system 104 may have its own fraud response systems which may be invoked for handling the results of detection of a fraudulent communication, similar to that described above with regard to fraud response system 140.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8°. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a request processing pipeline of a cognitive system for processing an input portion of text data corresponding to a communication in accordance with one illustrative embodiment. The request processing pipeline of FIG. 3 may be implemented, for example, as a QA pipeline or request processing pipeline 108 of cognitive system 100 in FIG. 1. It should be appreciated that the stages of the request processing pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The request processing pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the request processing pipeline 300 comprises a plurality of stages 310-380 through which the cognitive system operates to analyze an input request and generate a final result. In an initial input stage 310, the request processing pipeline 300 receives an input set of communication data, e.g., text data and speech pattern data. That is, as a user communicates via voice communication, the voice communication is analyzed to convert the communication to a textual data representation while preserving speech pattern data. This information is input to the request processing pipeline 300 as part of a background analysis operation for determining if the communication is fraudulent in nature. In response to receiving the input communication data, the next stage of the request processing pipeline 300, i.e. the feature extraction stage 320, parses the input text data, which may be provided as unstructured natural language that is parsed and subjected to natural language processing (NLP) techniques to extract major features from the input text data, and classify the major features according to types or topics, e.g., names, dates, or any of a plethora of other defined topics.

The identified major features are then used during the communication decomposition stage 330 to decompose the communication into one or more portions and corresponding term/phrase usage and speech pattern data, which is then processed by the voice authentication and fraud detection engine 390 to determine if the portions are associated with triggers of potential security issues and to determine if those portions are fraudulent in nature. Thus, the feature extraction stage 320 identifies and extracts the major features of the textual version of the input communication and the communication decomposition stage 330 identifies one or more portions of the communication and associates the major features and corresponding speech pattern data for those individual portions and provides these portions of the input communication to the voice authentication and fraud detection engine 390.

As shown in FIG. 3, the voice authentication and fraud detection engine 390 comprises various logic and data storage mechanisms for performing the operations of authenticating the source of the communication and/or detecting fraudulent communications. These logic and data storage mechanisms are similar to corresponding elements shown in FIG. 1 and operate in the manner previously described above with regard to one or more of the illustrative embodiments previously described.

Thus, the event/news ingestion engine 392 ingest documents associated with the particular protected entity, for which the voice authentication and fraud detection engine 390 operates, from the corpus or corpora 345, 347 and identifies trigger terms/phrases corresponding to events, news, and other information indicating areas or topics of security issues. For example, the event/news ingestion engine 392 may be configured with specific terms/phrases that it will look for in documents in the corpus/corpora that correspond to the particular protected entity or topics associated with the protected entity, and more specifically topics associated with particular security issues that are of interest to the protected entity. For a banking protected entity, the name of the bank and competitor banks may be terms looked for by the event/news ingestion engine 392. Moreover, topics of security information typically used by the bank, topics of security breaches with the protected entity or other competitor entities, or other topics corresponding to security issues that may be of interest to the bank may have corresponding key words or phrases that are identified in configuration information of the event/news ingestion engine 392 and which are used as a basis for identifying documents, or portions of documents, in the corpus/corpora 345, 347 of interest in determining trigger features which are stored in the trigger feature database 393. It should be appreciated that the operation of the event/news ingestion engine 392 may be performed periodically so as to generate trigger features that are associated with recent events/news. Hence, the trigger features in the database 393 may be periodically flushed and rebuilt so as to keep them current with recent events/news associated with the security issues pertinent to the protected entity.

The extracted feature evaluation engine 394 compares the extracted features, e.g., keywords and phrases, from the textual data of the portions of the communication with the trigger features in the trigger features database 393. For those portions of communications having matching keywords and phrases with one or more of the trigger features, those portions are marked as potential portions of communications where fraudulent exchanges may be present. These marked portions are provided to the user profile comparison engine 396.

The user profile comparison engine 396 compares user profile speech patterns, obtained from the user profile retrieved from the user profiles database 397 for the purported user providing the communication input, to the speech pattern data for the marked portions of the communication. The user profile comparison engine 396 calculates a degree of matching between the speech pattern of the user and the speech pattern present in the portions of the communications to generate an initial indication as to which of the marked portions of the communications are likely to be fraudulent and thereby flag those portions of the communications for further evaluation. These flagged portions are sent back to the pipeline 300 as portions of the communication that are likely fraudulent.

Additional scoring evaluations may be performed on these flagged portions of the communication by the possible fraudulent portion scoring logic stage 340. These additional evaluations may apply weighting values to different aspects of the degree of matching calculations, for example. The result is a confidence score associated with each of the flagged portions of the communication indicating a confidence that the flagged portion contains fraudulently provided content. The confidence scores associated with each of the flagged portions may be combined by the scoring logic stage 340 to generate a confidence score for the communication as a whole which indicates a confidence that the source of the communication, e.g., the user of the communication device providing the communication, is fraudulent in nature.

The resulting confidence score for the communication as a whole, or for each possibly fraudulent portion depending on the implementation, is compared to a threshold by threshold comparison logic stage 350. If the confidence score has a predetermined relationship with the threshold, e.g., equal to or greater than the threshold, then the portion the communication may be identified as fraudulent. The communication as a whole, or the identified fraudulent portion, is indicated to the fraudulent communication signaling logic stage 360 which generates a notification to the fraud response system 130. The fraud response system 130 then takes appropriate action, as discussed previously, to respond to the detected fraudulent communication.

Thus, the illustrative embodiments provide mechanisms for providing cognitive analysis of communications to determine if the source of the communication is who the user purports to be. The cognitive analysis is based on an identification of trigger terms/phrases and identified from the cognitive ingestion of documents or portions of documents associated with a protected entity or directed to topics of interest to the protected entity. These trigger terms/phrases identify portions of communications directed to areas where potential security issues may be present so as to allow for targeted analysis of speech patterns of the user with regard to these identified portions. The use of cognitive speech pattern analysis on the targeted portions of the communications allows for a more accurate indication of whether or not the user is in fact the person that the user alleges they are so that a more accurate determination of whether the communication is fraudulent or not can be performed.

Figure 4:
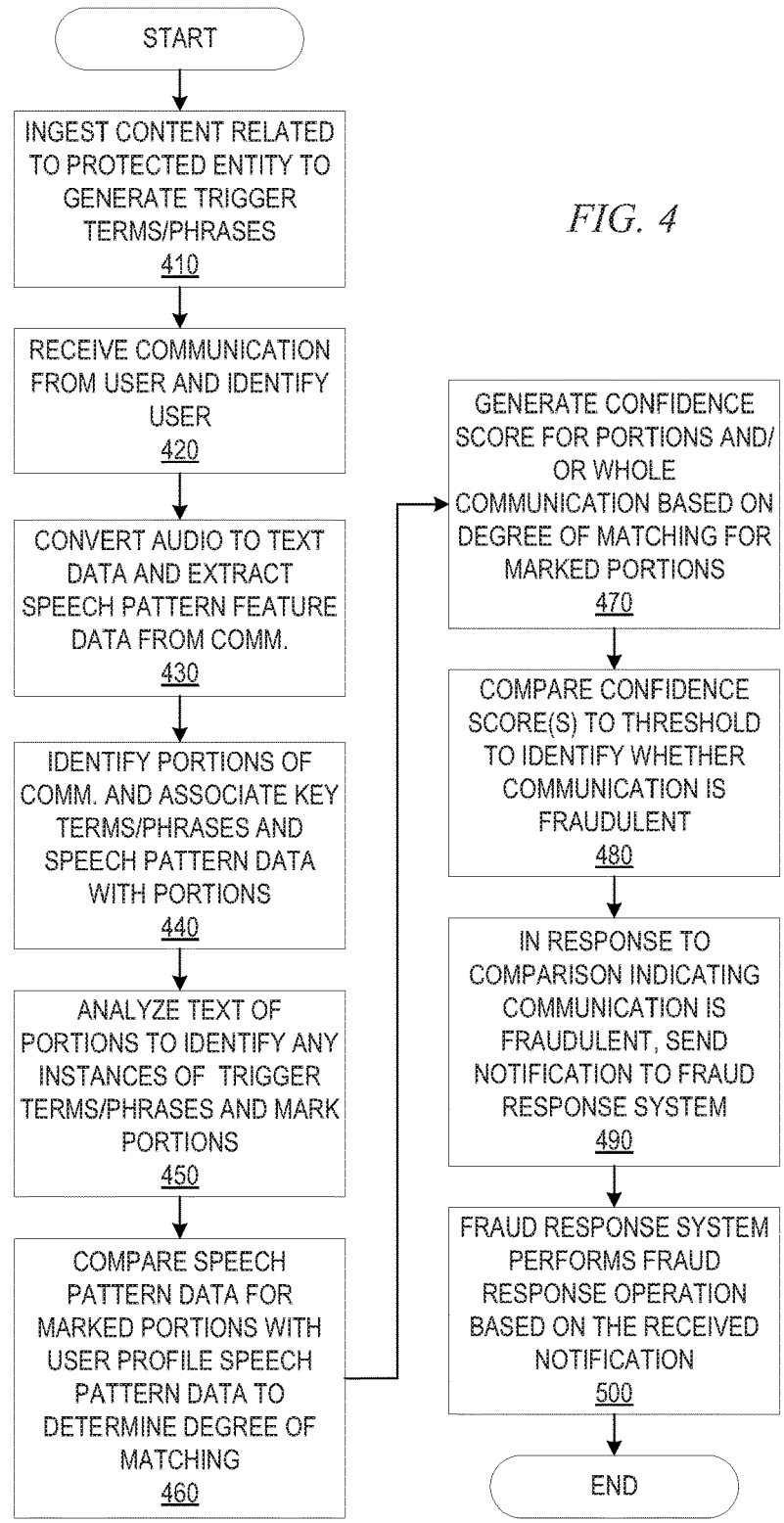
FIG. 4 is a flowchart outlining an example operation of a cognitive voice authentication and fraud detection engine in accordance with one illustrative embodiment.

FIG. 4 is a flowchart outlining an example operation of a cognitive voice authentication and fraud detection engine in accordance with one illustrative embodiment. As shown in FIG. 4, the operation starts by ingesting content of a corpus or corpora, where this content is related to the protected entity, to thereby generate trigger terms/phrases for identifying portions of communications directed to potential security issues associated with the protected entity (step 410). A communication is then received from a user and the identity of the person that the user alleges to be is identified (step 420). The audio portion of the communication is converted to text data and speech pattern data is extracted from the communication to thereby identify the speech features of the user that is the source of the communication (step 430). Portions of the communication are identified and are associated with the key terms/phrases in the corresponding text data, as well as corresponding speech pattern data (step 440).

The text data for the portions is analyzed to identify those portions, if any, that have key terms/phrases that match one or more of the trigger terms/phrases (step 450). Those portions that have matching terms/phrases are marked as potential portions having fraudulently supplied content. For those marked portions, the speech pattern data of those portions is compared to user profile speech pattern data for the identity that the user alleges in order to determine a degree of matching (step 460). Based on the degrees of matching for each of these marked portions, a confidence score is generated for those portions and/or the communication as a whole (step 470). The confidence score(s) are compared to a threshold to identify whether the communication is likely fraudulent (step 480). In response to the comparison resulting in a determination that the communication is likely fraudulent, a notification is sent to a fraud response system (step 490). The fraud response system then performs an appropriate fraud response operation based on the received notification (step 500) and the operation terminates. While FIG. 4 illustrates the operation terminating, it should be appreciated that the steps shown in FIG. 4, or portions thereof, may be repeated for each subsequently received communication.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, implemented using at least one processor and at least one memory for detecting a potentially fraudulent voice conversation, the method comprising:

processing, by the data processing system, a corpus of electronic information to extract a fraud feature representative of at least one fraudulent activity, wherein the fraud feature is a textual representation of a fraudulent activity identified from one or more of reported information, events, or news identifying anomalous behavior;

receiving, by the data processing system, a first voice input from a user;

converting, by the data processing system, the first voice input into a first textual representation of the first voice input and a first set of one or more behavioral speech characteristics associated with the user;

generating, by the data processing system, a speech model for the user based on the first textual representation and the first set of one or more behavioral speech characteristics;

receiving, by the data processing system, a second voice input from an entity requesting access to resources associated with the user;

converting the second voice input to a second textual representation of the second voice input and second set of one or more behavioral speech characteristics;

evaluating, by the data processing system, the second voice input based on the speech model for the user and the fraud feature, wherein evaluating the second voice input comprises:

identifying, based on the fraud feature, a portion of the second textual representation and corresponding second set of one or more behavioral speech characteristics; and comparing the portion of the second textual representation and corresponding second set of one or more behavioral speech characteristics to the first set of one or more behavioral speech characteristics in the speech model to generate a measure of confidence that the portion of the second textual representation is part of the fraudulent activity identified from the one or more of reported information, events, or news identifying the anomalous behavior; and generating, by the data processing system, an output indicating whether or not the entity is the user based on results of the evaluation.

2. The method of claim 1, wherein the one or more behavioral speech characteristics comprise a set of words or phrases that the user utilizes, equal to or more than a predetermined threshold number of times, when speaking with other persons.

3. The method of claim 2, wherein the set of words or phrases are identified in a predetermined portion of a conversation corresponding to one of a salutation at a beginning of the conversation or a final signature at a close of the conversation.

4. The method of claim 1, wherein the one or more behavioral speech characteristics comprise a pattern of pauses between words spoken by the user.

5. The method of claim 1, wherein the one or more behavioral speech characteristics comprise at least one of a pattern of inflections or an indicator of an accent utilized by the user.

6. The method of claim 1, wherein evaluating the second voice input comprises identifying the portion of the second voice input, having a feature that corresponds to the fraud feature, for processing based on the speech model.

7. The method of claim 1, wherein processing the corpus of electronic information to extract a fraud feature representative of at least one fraudulent activity comprises performing natural language processing on electronic natural language documents of the corpus to extract the fraud feature.

8. The method of claim 1, wherein the corpus of electronic information is a corpus associated with a domain corresponding to a protected or protective entity associated with the data processing system, and wherein at least one electronic document in the corpus comprises information describing aspects of fraudulent activity from which the fraud feature is extracted, and wherein the fraud feature specifies at least one manner by which a perpetrator of the fraudulent activity communicates with another entity.

9. The method of claim 1, further comprising training a cognitive system based on the speech model to recognize speech patterns of the user based on the one or more behavioral speech characteristics.

10. The method of claim 1, wherein comparing the portion of the second textual representation and corresponding second set of one or more behavioral speech characteristics to the one or more behavioral speech characteristics in the speech model to generate a measure of confidence comprises:

scoring features of the portion of the second textual representation based on the comparison to generate a fraud score; and comparing the fraud score to a fraud threshold value, wherein generating the output comprises generating a first output indicating fraudulent activity in response to the fraud score equaling or exceeding the fraud threshold value or generating a second output indicating no fraudulent activity in response to the fraud score not equaling or exceeding the fraud threshold value.

11. A computer program product comprising a computer readable storage medium having a computer readable program stored therein, wherein the computer readable program, when executed on a computing device, causes the computing device to be specifically configured to detect a potentially fraudulent voice conversation at least by:

processing a corpus of electronic information to extract a fraud feature representative of at least one fraudulent activity, wherein the fraud feature is a textual representation of a fraudulent activity identified from one or more of reported information, events, or news identifying anomalous behavior;

receiving a first voice input from a user;

converting the first voice input into a first textual representation of the first voice input and a first set of one or more behavioral speech characteristics associated with the user;

generating a speech model for the user based on the first textual representation and the first set of one or more behavioral speech characteristics;

receiving a second voice input from an entity requesting access to resources associated with the user;

converting the second voice input to a second textual representation and second set of one or more behavioral speech characteristics;

evaluating the second voice input based on the speech model for the user and the fraud feature, wherein the computer readable program further causes the computing device to evaluate the second voice input at least by:

identifying, based on the fraud feature, a portion of the second textual representation and corresponding second set of one or more behavioral speech characteristics; and comparing the portion of the second textual representation and corresponding second set of one or more behavioral speech characteristics to the first set of one or more behavioral speech characteristics in the speech model to generate a measure of confidence that the portion of the second textual representation is part of the fraudulent activity identified from the one or more of reported information, events, or news identifying the anomalous behavior; and generating an output indicating whether or not the entity is the user based on results of the evaluation.

12. The computer program product of claim 11, wherein the one or more behavioral speech characteristics comprise a set of words or phrases that the user utilizes, equal to or more than a predetermined threshold number of times, when speaking with other persons.

13. The computer program product of claim 12, wherein the set of words or phrases are identified in a predetermined portion of a conversation corresponding to one of a salutation at a beginning of the conversation or a final signature at a close of the conversation.

14. The computer program product of claim 11, wherein the one or more behavioral speech characteristics comprise at least one of a pattern of pauses between words spoken by the user, a pattern of inflections used by the user, or an indicator of an accent utilized by the user.

15. The computer program product of claim 11, wherein the computer readable program further causes the computing device to evaluate the second voice input at least by identifying the portion of the second voice input, having a feature that corresponds to the fraud feature, for processing based on the speech model.

16. The computer program product of claim 11, wherein the computer readable program further causes the computing device to process the corpus of electronic information to extract a fraud feature representative of at least one fraudulent activity at least by perfuming natural language processing on electronic natural language document of the corpus to extract the fraud feature.

17. The computer program product of claim 11, in the corpus of electronic information is a corpus associated with a domain corresponding to a protected or protective entity associated with the data processing system, and wherein at least one electronic document in the corpus comprise information describing aspects of fraudulent activity from which the fraud feature is extracted, and wherein the fraud feature specifies at least one manner by which a perpetrator of the fraudulent activity communicates with another entity.

18. The computer programs product of claim 11, wherein the computer readable program further causes the computing device to train a cognitive system based on the speech model to recognize speech patterns of the user based on the one or more behavioral speech characteristics.

19. The computer program product of claim 1, wherein the computer readable program further causes the computing device to compare the portion of the second textual representation and corresponding second set of one or more behavioral speech characteristics to the one or more behavioral speech characteristics in the speech model to generate a measure of confidence at least by:

scoring features of the portion of the second textual representation based on the comparison to generate a fraud score; and comparing the fraud score to a fraud threshold value, wherein generating the output comprises generating a first output indicating fraudulent activity in response to the fraud score equaling or exceeding the fraud threshold value or generating a second output indicating no fraudulent activity in response to the fraud score not equaling or exceeding the fraud threshold value.

20. An apparatus comprising:

a processor; and a memory coupled to the processor, wherein the memory comprises instructions which, when executed by the processor, cause the processor to be specifically configured to detect a potentially fraudulent voice conversation at least by:

processing a corpus of electronic information to extract a fraud feature representative of at least one fraudulent activity, wherein the fraud feature is a textual representation of a fraudulent activity identified from one or more of reported information, events, or news identifying anomalous behavior;

receiving a first voice input from a user;

converting the first voice input into a first textual representation of the first voice input and a first set of one or more behavioral speech characteristics associated with the user;

generating a speech model for the user based on the first textual representation and the first set of one or more behavioral speech characteristics;

receiving a second voice input from an entity requesting access to resources associated with the user;

converting the second voice input to a second textual representation and second set of one or more behavioral speech characteristics;

evaluating the second voice input based on the speech model for the user and the fraud feature, wherein the computer readable program further causes the computing device to evaluate the second voice input at least by:

identifying, based on the fraud feature, a portion of the second textual representation and corresponding second set of one or more behavioral speech characteristics; and comparing the portion of the second textual representation and corresponding second set of one or more behavioral speech characteristics to the first set of one or more behavioral speech characteristics in the speech model to generate a measure of confidence that the portion of the second textual representation is part of the fraudulent activity identified from the one or more of reported information, events, or news identifying the anomalous behavior; and generating an output indicating whether or not the entity is the user based on results of the evaluation.

* * * * *